United States Patent [19]

Kipp et al.

[11] Patent Number: 4,573,713
[45] Date of Patent: Mar. 4, 1986

[54] BELLE-LOCK GRIP DEVICE

[75] Inventors: Robert M. Kipp; Ray R. Ayers, both of Houston, Tex.

[73] Assignee: Shell Oil Company, Houston, Tex.

[21] Appl. No.: 443,367

[22] Filed: Nov. 22, 1982

[51] Int. Cl.⁴ ............................................. F16L 37/12
[52] U.S. Cl. .................................. 285/319; 285/340; 285/382.2
[58] Field of Search ...................... 285/340, 319, 382.2

[56] References Cited

U.S. PATENT DOCUMENTS

| | | | |
|---|---|---|---|
| 991,374 | 5/1911 | Rolle | 285/319 |
| 2,209,181 | 7/1940 | Wendel | 285/340 X |
| 2,992,840 | 7/1961 | Reynolds et al. | 285/340 X |
| 2,995,388 | 8/1961 | Morello, Jr. et al. | 285/340 |
| 3,697,102 | 10/1972 | Falke | 285/340 |
| 3,985,379 | 10/1976 | Normark | 285/340 |
| 4,084,843 | 4/1978 | Gassert | 285/340 X |
| 4,235,461 | 11/1980 | Normark | 285/340 |
| 4,373,753 | 2/1983 | Ayers et al. | 285/340 X |
| 4,478,439 | 10/1984 | Arnold | 285/340 |

FOREIGN PATENT DOCUMENTS

| | | | |
|---|---|---|---|
| 746391 | 11/1966 | Canada | 285/340 |
| 2635871 | 2/1978 | Fed. Rep. of Germany | 285/319 |

*Primary Examiner*—Thomas F. Callaghan

[57] ABSTRACT

The present invention provides a pipeline connector which uses collected conical rings as a holding mechanism designed to penetrate a pipe surface as they are simultaneously flattened. Several rings are required to achieve the total required shear load transfer area. The penetrating rings preferably are separated by shorter, non-penetrating rings to increase the loading area, thus limiting the external pressure loading on the pipeline.

10 Claims, 10 Drawing Figures

BELLE-LOCK GRIP DEVICE

BACKGROUND OF THE INVENTION

In both offshore and onshore pipeline construction, the manually welded joint has become the standard by which other forms of pipeline joining are evaluated. Pipe joining, by whatever means, is more costly offshore where weather conditions can severely hinder pipeline construction operations. In recent years considerable improvements have been made in conventional pipelaying systems, and more specifically in pipe joining processes. Semi-automatic and then fully automatic welding systems have been developed, proven in the field, and now accepted offshore. However, the art remains deficient in the provision of mechanical connectors for diverless, subsea tie-ins of large diameter pipe in deep water. Accordingly, the present invention is directed to overcoming this deficiency of the art.

REFERENCE TO RELATED APPLICATIONS

The invention of the present application is related to the inventions of application Ser. No. 264,317 filed May 18, 1981 now U.S. Pat. No. 4,373,753; application Ser. No. 335,913 filed Dec. 30, 1981 now U.S. Pat. No. 4,489,964; application Ser. No. 342,536, filed Jan. 25, 1982 now abandoned; and application Ser. No. 444,416 filed Nov. 24, 1982 now U.S. Pat. No. 4,500,117.

SUMMARY OF THE INVENTION

The purpose of the present invention is to provide a connector which is locked together using a small loading force.

This purpose is achieved by providing a gripping device composed of at least one conical ring disposed about an annular member, and means for flattening the conical ring to expand its diameter and exert a contracting force upon the annular member. The conical rings preferably are colleted, and each has a trapezoidal cross section with a radial length to thickness ratio from about 1.5 to about 15, and more preferably in the 3 to 5 range. Alternatively, the cross-section of the conical ring may be a parallelogram. Preferably, the conical rings are maintained spaced by alternating reduced diameter rings and by ridges on the annular member which restrict lateral movement of the conical rings. More preferably, each conical ring has a tip operative to penetrate the annular member.

The annular member may be a pipe surface, a grapple of discrete pieces held slightly spaced apart in the shape of a ring, a grapple of slightly spaced-apart pieces joined alternately at opposite ends, or a collet of slightly spaced-apart fingers joined at one end. Preferably, the annular member is disposed inside an annular ring and is laterally movable and the flattening means is a shoulder of the annular ring which abuts the conical ring. More preferably, the annular ring is secured to the annular member prior to activation of the compressing means by several locking dogs and shear pins.

DESCRIPTION OF PREFERRED EMBODIMENTS

Figure 1A:
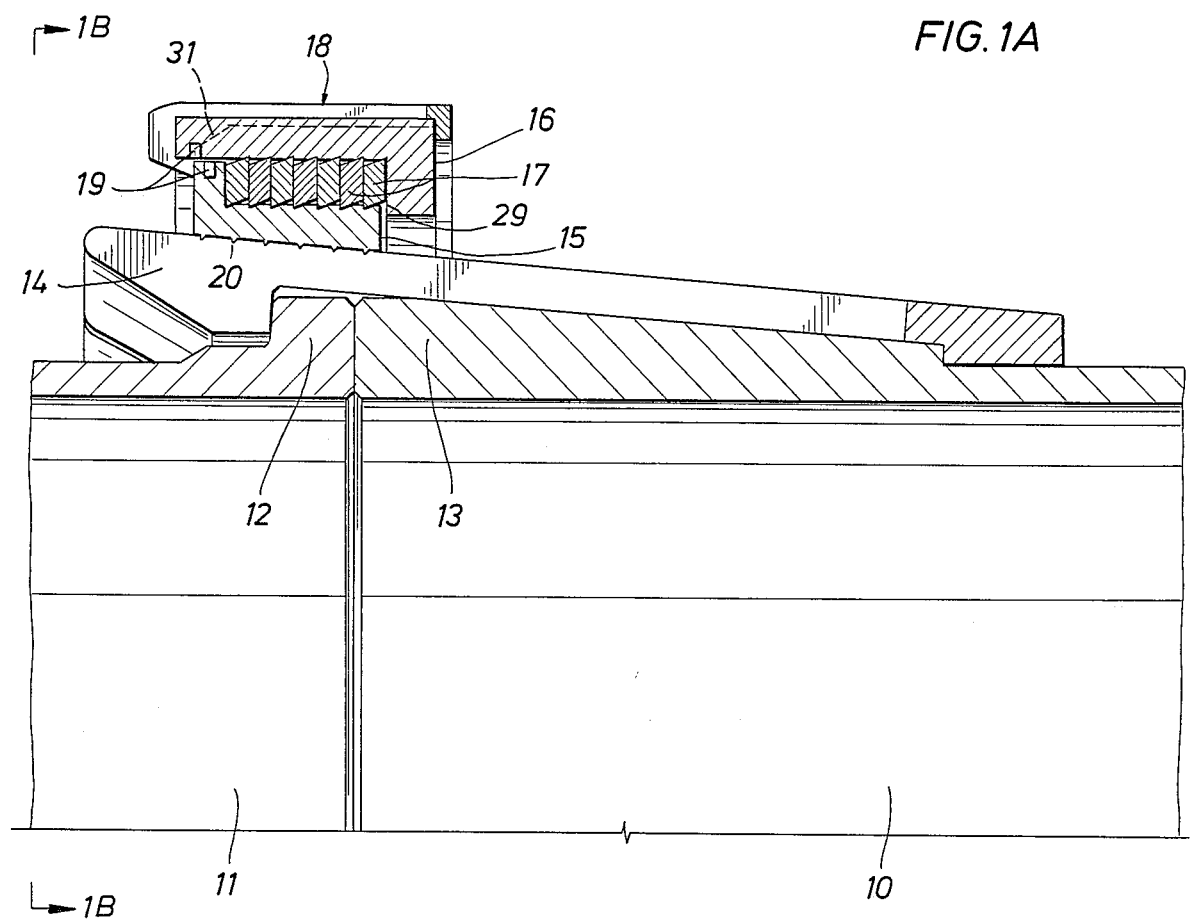
FIG. 1(A) discloses a locking mechanism for a spring finger connector.
Figure 1B:
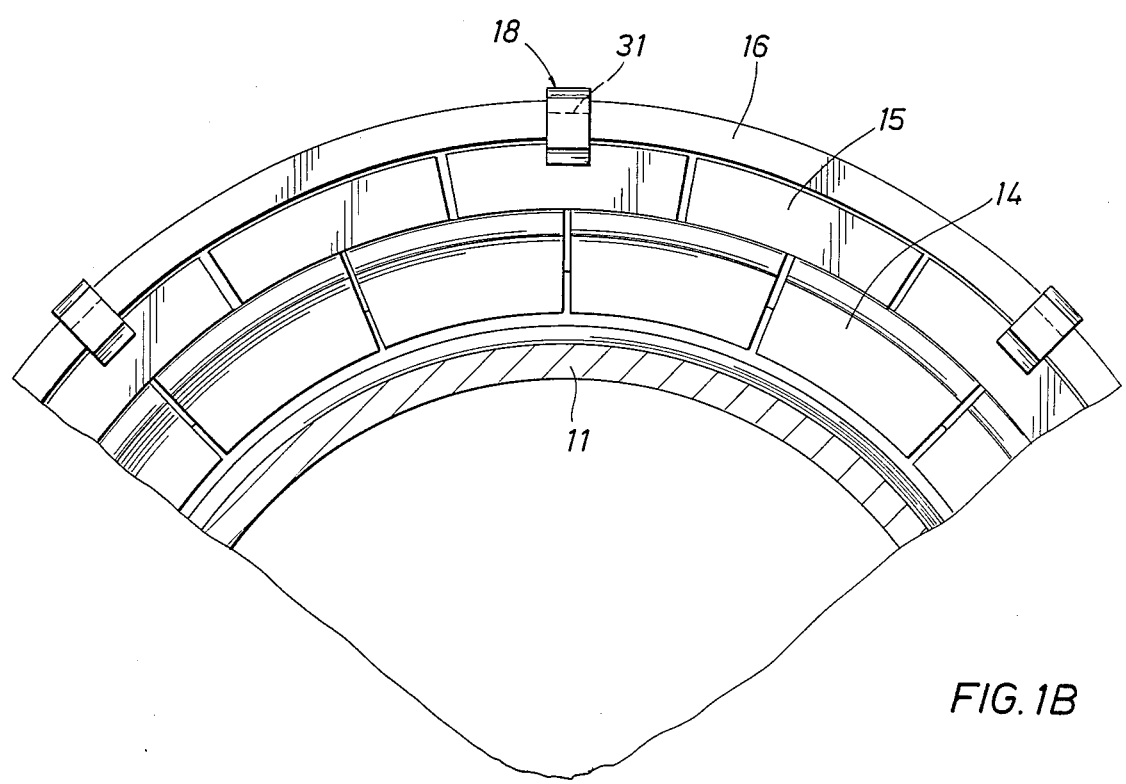
FIG. 1(B) discloses an end view of the mechanism of FIG. 1(A).

In the embodiments of FIGS. 1(A) and 1(B), pipe ends 10 and 11 having hubs 12 and 13 are connected by spring fingers 14. The spring fingers are locked into position by the locking mechanism of the present invention which is composed of a grapple 15 and drive ring 16 which define a space therebetween containing locking rings 17. Prior to locking of the mechanism, the device is held together by shear pins 19.

The mechanism of FIGS. 1(A) and 1(B) is actuated or locked into place by shoving drive ring 16 to the left so that its shoulder 29 compresses the locking rings 17, whereupon shear pins 19 are severed. Each of the locking rings 17 has a conical or frusto-conical shape and when compressed undergoes an angular change and flattens. As each ring flattens, its effective radial thickness increases, thereby putting radial pressure against drive ring 16 and grapple 15. As grapple 15 is pressed radially inward, it contracts and the friction improving surface 20 presses into spring fingers 14. When the locking rings 17 are almost fully compressed the spring finger locking dogs 18 snap over the grapple 15 near the shear pin location 19, thereby effectively locking the grapple 15 and the drive ring 16 together and completing the connection. Locking dogs 18 fit into grooves 31 (shown in phantom) on drive ring 16 which hold the locking dogs straight.

Figure 1C:
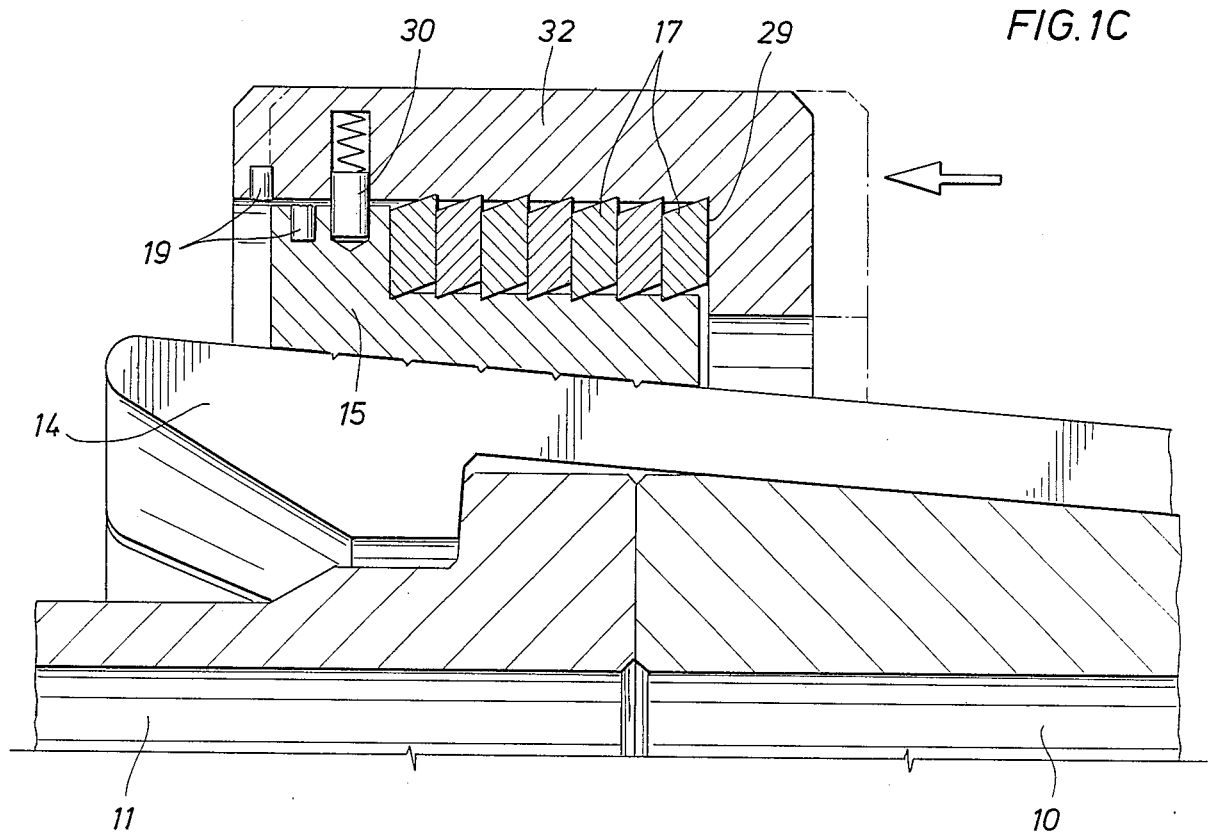
FIGS. 1(C) and 1(D) pertain to modifications of the embodiment of FIGS. 1(A) and 1(B).

A modification of the mechanism of FIGS. 1(A) and 1(B) is shown in FIG. 1(C). A spring-loaded pin 30 is substituted for locking dogs 18. As drive ring 32 is moved from its original position (shown in phantom) to a locked position, shear pins 19 are severed, as in the embodiment of FIGS. 1(A) and 1(B), and spring-loaded pin 30 drops into a locking position.

Figure 1D:
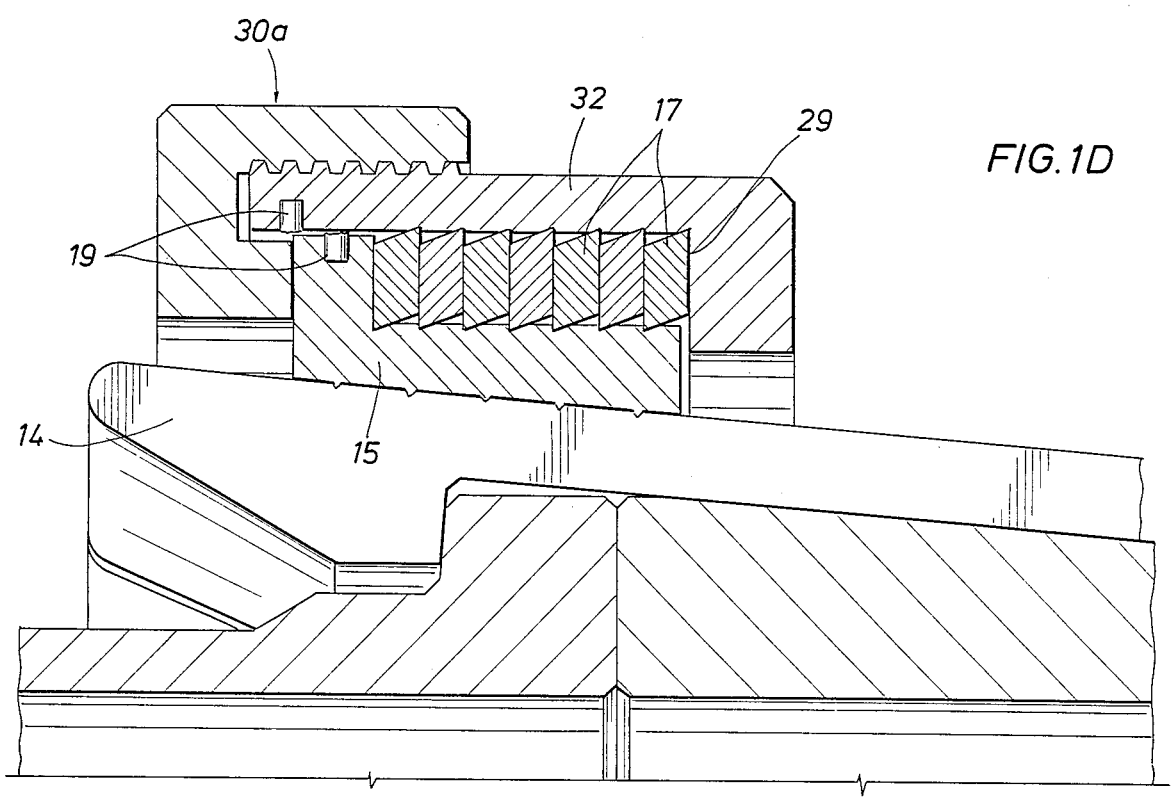

An alternative to using a spring-loaded pin 30 in FIG. 1(C) is to use a screw-on ring 30(a) shown in FIG. 1(D). Once the required locking ring force is achieved, the screw-on ring 30(a) can be tightened prior to removing the locking force.

Figure 2:
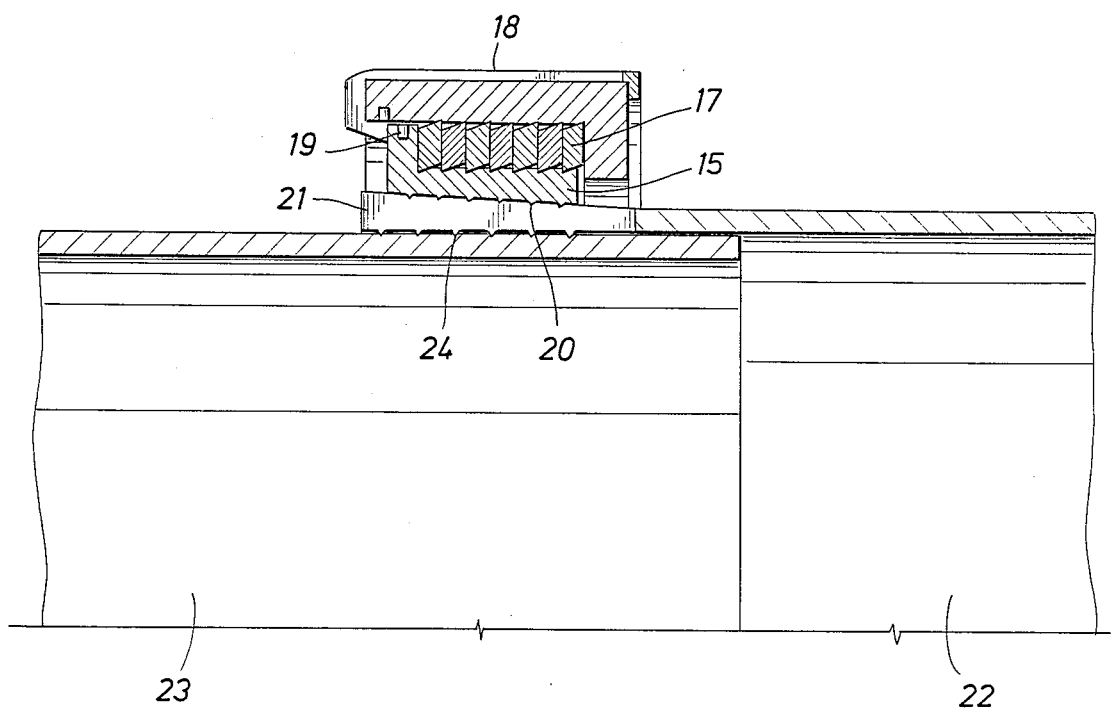
FIG. 2 pertains to a locking mechanism which acts on a colletized pipe end and is used to join the plain end of a pipe.

A second embodiment of the invention is shown in FIG. 2. Instead of spring fingers 14, there is provided colletized fingers 21 which are an integral part of the pipe end 22. The colletized fingers 21 have protuberances 24 which provide better gripping of pipe end 23. As in the embodiment of FIG. 1, the friction improving surface 20 provides better gripping of pipe end 22 by grapple 15. As in the first embodiment, connector seals are not shown since this invention specifically deals with connector locking.

Figure 3:
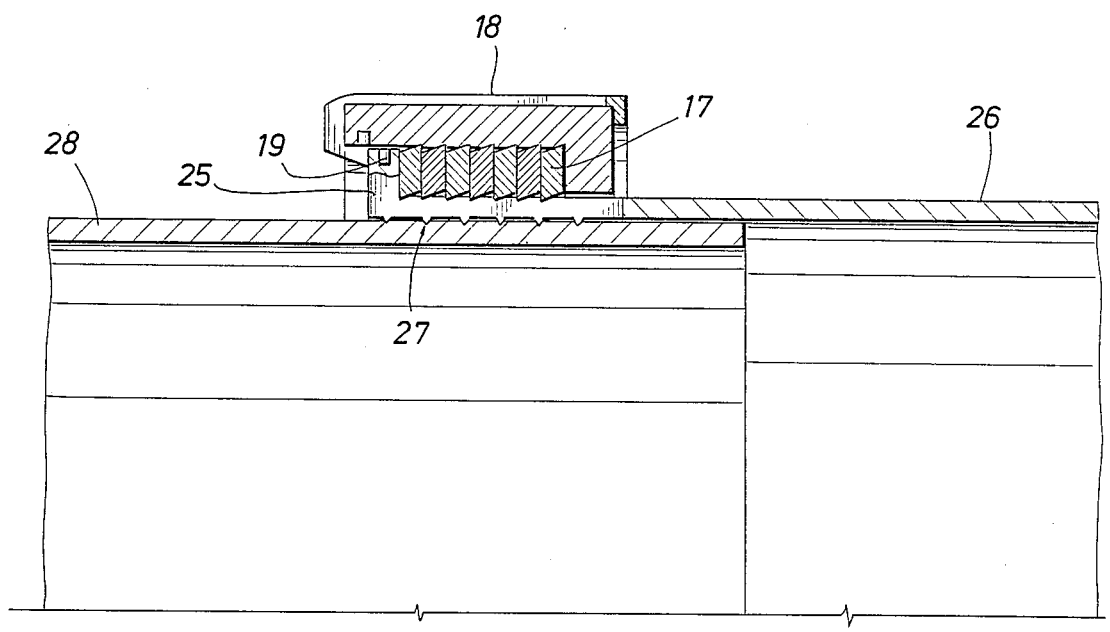
FIG. 3 discloses a locking mechanism which is a variation of the mechanism of FIG. 2.

FIG. 3 provides a third embodiment of the invention wherein colletized gripping fingers 25 also are a part of the pipe end 26. When the term 'colletized fingers' is used, it is intended that the fingers be slightly spaced apart and capable of contracting upon compression and be essentially connected forming a complete ring at one end. When the term 'grapple' is used, the pieces of grapple are either completely discrete and spaced apart and held together by separate means or connected alternately at opposing ends. In the embodiment of FIG. 3 the colletized gripping fingers 25 also have a roughened surface 27 which secures pipe end 26 to pipe end 28.

The locking rings 17 of the present invention are axially thicker and radially shorter than the well known Belleville axial spring which is in the shape of a conical disk. Locking rings 17 provide superior gripping properties due to the large change in outside and inside diameter during actuation and the unique load-displacement relationship which is achieved as the rings flatten under compression. The load-deflection characteristics of the rings are non-linear as a result of change in shape of the rings during flattening. Within limits, the initial shape of the rings may be chosen to achieve a desired flattening, or actuation load. In order to be used as a gripping means, the ring must have a sharp edge for penetration, a relatively soft but rigid body to grip, and a shape which has a good mechanical advantage (based on its load-deflection curve).

If a single locking ring 17 does not develop a sufficient shear load transfer area, it is preferable to use multiple rings. Such rings preferably are spaced far enough apart so that the gripped pipe, collet, grapple or other body will not be subjected to excessive penetrating pressure. Also, the rings are designed to avoid interference with each other when rotated, i.e. compressed. Proper ring spacing is achieved, in accordance with one embodiment, by the use of "dummy" gripping rings. The "dummy" rings are short enough to prevent penetration of the pipe, etc., and simply function to separate the gripping rings.

Figure 4:
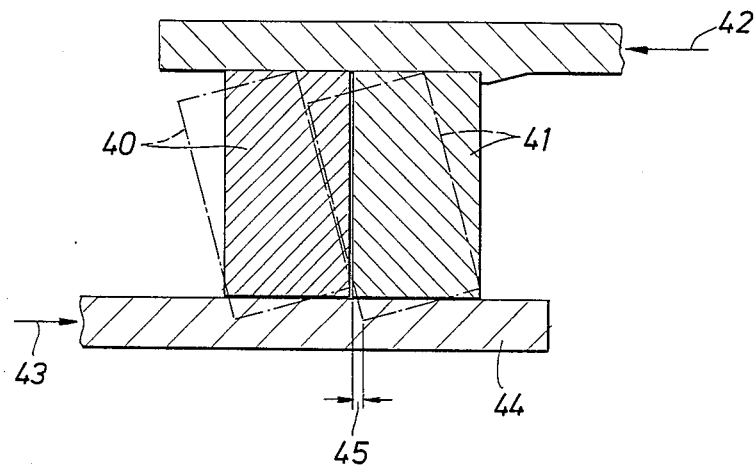
FIGS. 4 to 7 show various configurations of lock rings.
Figure 5:
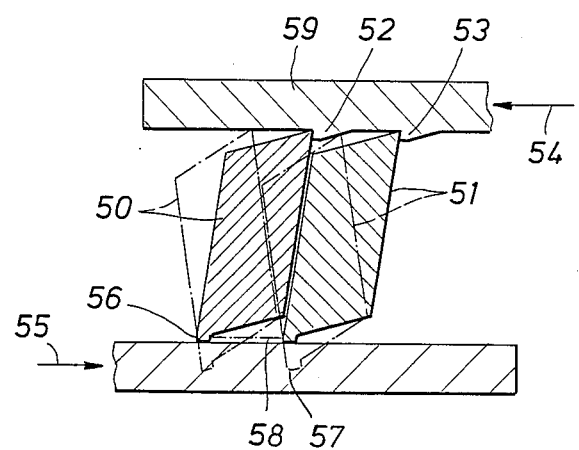

Proper design of the gripping rings to overcome rotation problems is illustrated in FIGS. 4 and 5. FIG. 4 shows two flat rings 40 and 41 which have been rotated by applying opposing forces 42 and 43 at their corners. If the inside corner of one ring is assumed fixed relative to the inner barrel 44, the inside corner of the other ring must slide (see slip 45) along the barrel. Sliding is not compatible with penetration because either a broad band of disturbed material is created rather than a sharp band of penetration or too much penetration occurs at first, preventing further sliding so that full rotation and thus full penetration is not developed.

A preferred design is shown in FIG. 5 which depicts how rings which are initially rotated will rotate into a final position in which all rings are in full contact with each other without sliding on the gripping surface. Several design requirements achieve this objective: first, the rings are parallelograms instead of rectangles; second, to achieve maximum penetration at the end of each stroke, the diagonal of the ring cross section does not pass vertical before the end of the stroke; and third, individual drive means are provided for each ring so they will maintain proper spacing during actuation while they are not in contact with each other. Thus, note that outer barrel 59 is provided with ridges 52 and 53 which maintain position of rings 50 and 51 during application of forces 54 and 55. Also, rings 50 and 51 have penetrating tips 56 and 57 which are held in position by drive spacer 58.

Figure 6:
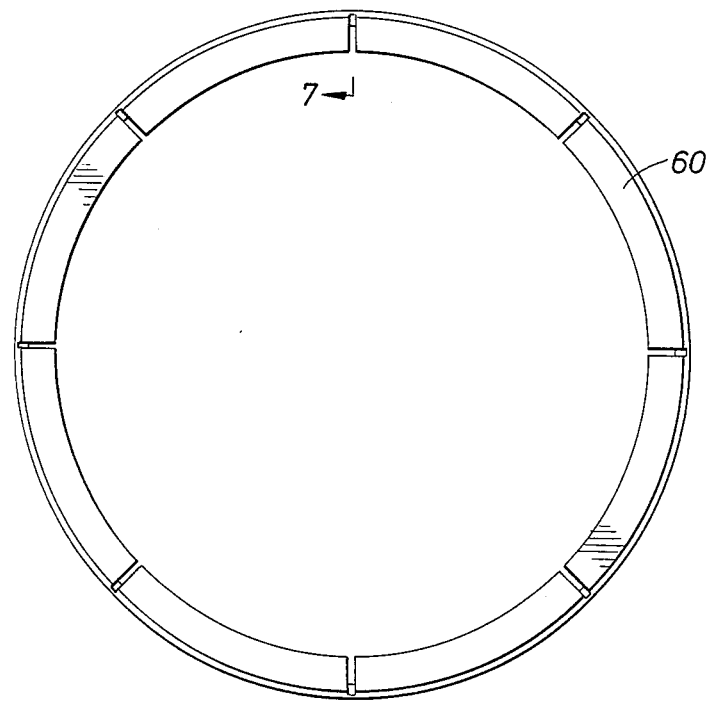
Figure 7:
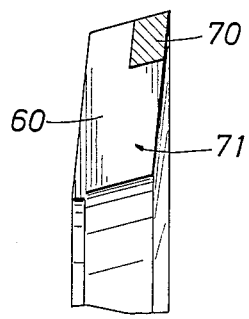

The actuation force is greater for the multiple ring assembly because the rings act in parallel and they are initially tipped, which is a stiffer configuration than the flat ring. Since the rings resist rotation by hoop stress, the resistance may be decreased by eliminating circumferential continuity, e.g. by creating collets of ring 60 as shown in FIG. 6. The collets do not significantly alter the gripping strength of the ring since shear load transfer area is not changed. FIG. 7 shows the cross section of the ring at the partially cut area. Section 70 remains as section 71 is removed from ring 60.

Other embodiments and modifications of the present invention will be apparent to those skilled in the art without departing from the scope and spirit of the present disclosure and appended claims.

What is claimed is:

1. A gripping mechanism comprising:
   multiple conical rings encircling an inner barrel, each ring having a parallelogram cross-section;
   an outer barrel encircling the multiple conical rings;
   a tip extending outwardly from an edge of the parallelogram cross-section of each conical ring, the tip being adjacent to the inner barrel and being on the same respective edge of each conical ring;
   a series of spaced-apart ridges within the outer barrel, each ridge engaging an edge of a conical ring which is diagonally across from the tip of the conical ring; and
   means to axially and oppositely slide the inner and outer barrels relative to each other, which movement is functionable to twist the multiple conical rings which in turn are functionable to press the tips of the rings against the inner barrel.

2. The gripping mechanism of claim 1 wherein the inner barrel is a pipe surface.

3. The gripping mechanism of claim 1 wherein the inner barrel is a grapple of discrete, spaced-apart elements.

4. The gripping mechanism of claim 3 wherein the elements are joined alternately at opposite ends.

5. The gripping mechanism of claim 1 wherein the inner barrel is a collet of spaced-apart fingers joined at one end.

6. The gripping mechanism of claim 1 wherein the conical rings are colleted.

7. The gripping mechanism of claim 1 including locking means for securing the position of the inner barrel relative to the outer barrel subsequent to the twisting of the conical rings.

8. The gripping mechanism of claim 7 wherein the locking means is a locking dog.

9. The gripping mechanism of claim 7 wherein the locking means is a spring-loaded pin.

10. The gripping mechanism of claim 7 wherein the locking means is a screw-on ring.

* * * * *